United States Patent [19]
Wölfl et al.

[11] Patent Number: 5,346,379
[45] Date of Patent: Sep. 13, 1994

[54] EXTRUDING DEVICE FOR EXTRUDING PLASTIC TUBING WITH A MEASURING DEVICE FOR MEASURING THE WALL THICKNESS OF THE PLASTIC TUBING

[75] Inventors: Volkmar R. Wölfl, Vlotho-Valdorf; Ulrich Neumann, Bad Oynhausen, both of Fed. Rep. of Germany

[73] Assignee: CONPRO GmbH, Vlotho, Fed. Rep. of Germany

[21] Appl. No.: 962,385

[22] Filed: Oct. 16, 1992

[30] Foreign Application Priority Data

Oct. 17, 1991 [DE] Fed. Rep. of Germany ....... 4134285

[51] Int. Cl.⁵ .............................................. B29C 47/00
[52] U.S. Cl. .................................... 425/67; 73/622; 264/23; 264/40.1; 425/70; 425/71; 425/174.2; 425/326.1; 425/388; 425/392; 425/141
[58] Field of Search ................ 73/622; 264/23, 40.1; 425/67, 68, 70, 71, 141, 172, 174, 174.2, 190, 326.1, 388, 392, 404, 445

[56] References Cited

U.S. PATENT DOCUMENTS

| 3,856,595 | 12/1974 | Skobel | 425/141 |
|---|---|---|---|
| 4,137,028 | 1/1979 | Reitemeyer et al. | 425/141 |
| 4,740,146 | 4/1988 | Angelbeck | 425/71 |
| 4,750,873 | 6/1988 | Loe et al. | 425/326.1 |
| 5,085,567 | 2/1992 | Neumann | 425/174.2 |
| 5,120,212 | 6/1992 | Reiber et al. | 425/141 |

FOREIGN PATENT DOCUMENTS

| 2505221 | 8/1976 | Fed. Rep. of Germany | 425/141 |
|---|---|---|---|
| 8816435 | 2/1988 | Fed. Rep. of Germany | |
| 3906363 | 3/1989 | Fed. Rep. of Germany | |
| 3936496 | 11/1989 | Fed. Rep. of Germany | |
| 4002884 | 2/1990 | Fed. Rep. of Germany | |
| 4033443 | 10/1990 | Fed. Rep. of Germany | |
| 55-216 | 1/1980 | Japan | 425/174.2 |

OTHER PUBLICATIONS

W. Feistkorn and K. Sensen; "Automatik-... Kaschierfolie"; 1987; pp. 472–474.

*Primary Examiner*—Charles S. Bushey
*Attorney, Agent, or Firm*—Robert W. Becker & Associates

[57] ABSTRACT

An extruding device for extruding plastic tubing includes an extruder with an outlet and a cooling device connected to the outlet of the extruder. The cooling device has a water-filled chamber and a vacuum tank that is directly connected downstream to the water-filled chamber such that a sealed passage for the plastic tubing between the water-filled chamber and the vacuum tank is provided. The water-filled chamber has a water-filled cooling part and a water-filled measuring part. A water- and vacuum-conveying connection is provided between the measuring part and the vacuum tank. A calibrating sleeve with an inner wall surface is connected within the cooling part and is completely immersed in water for cooling purposes. The calibrating sleeve pulls the extruded plastic tubing against its inner wall surface. A measuring device for measuring the wall thickness of the plastic tubing is connected with the measuring part. The measuring part has at least one ultrasonic measuring head that is radially positioned relative to the plastic tubing. The measuring head measures the plastic tubing through the water within the measuring part.

23 Claims, 4 Drawing Sheets

EXTRUDING DEVICE FOR EXTRUDING PLASTIC TUBING WITH A MEASURING DEVICE FOR MEASURING THE WALL THICKNESS OF THE PLASTIC TUBING

BACKGROUND OF THE INVENTION

The present invention relates to an extruding device for extruding plastic tubing, the device comprised of: an extruder with an outlet; a cooling device connected to the outlet of the extruder with a water-cooled calibrating sleeve within the cooling device for pulling the extruded plastic tubing against the inner wall surface of the calibrating sleeve; a circulating cooling element in the form of a vacuum tank; and a measuring device for measuring the wall thickness of the plastic tubing having one or more ultrasonic measuring heads radially oriented relative to the plastic tubing.

An extruding device of the aforementioned kind is known from German Offenlegungsschrift 39 36 496. In this known device the calibrating sleeve is provided with separate cooling medium channels for guiding therethrough a cooling medium, preferably water. At the end of the calibrating sleeve a measuring device for measuring the wall thickness of the tubing is provided and includes respective measuring heads. The device further comprises an annular recess surrounding the tubing to be measured and into which water is introduced for effecting the transmission of ultrasonic waves between the measuring heads and the tubing to be measured whereby the measuring heads are radially arranged within the water-filled recess.

The known extruding device has the disadvantage that the calibrating sleeve is of a relatively complicated design due to the separate cooling medium channels. Furthermore, a separate feed line must be connected to the calibrating sleeve in order to introduce the cooling medium. A further technical disadvantage is that the ultrasonic coupling of the measuring heads with the plastic tubing to be measured is insufficient. Since the plastic tubing passes through the measuring device during the measurement and also passes the inner side of the water-filled annular recess, sealing of the annular recess is almost impossible to control. This is so because the plastic tubing is still deformable since it is still soft and thus variable at its outer diameter, for example, by changes of the vacuum as well as due to the vacuum present within the chamber so that water loss within the area of the annular recess cannot be prevented. However, these water losses affect the accuracy of the measurements considerably. An additional disadvantage is that the height of the water column between tubing and measuring head depends on the wall thickness of the plastic tubing to be measured so that for a change in the wall thickness the water column must be adapted. This, however, is almost impossible due to the design-based dimensions of the annular recess within the measuring device.

It is therefore an object of the present invention to provide an extruding device of the aforementioned kind with which the accuracy of the measurements is improved, while at the same time the extruding device must be simplified in its design and improved with respect to its operational reliability.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
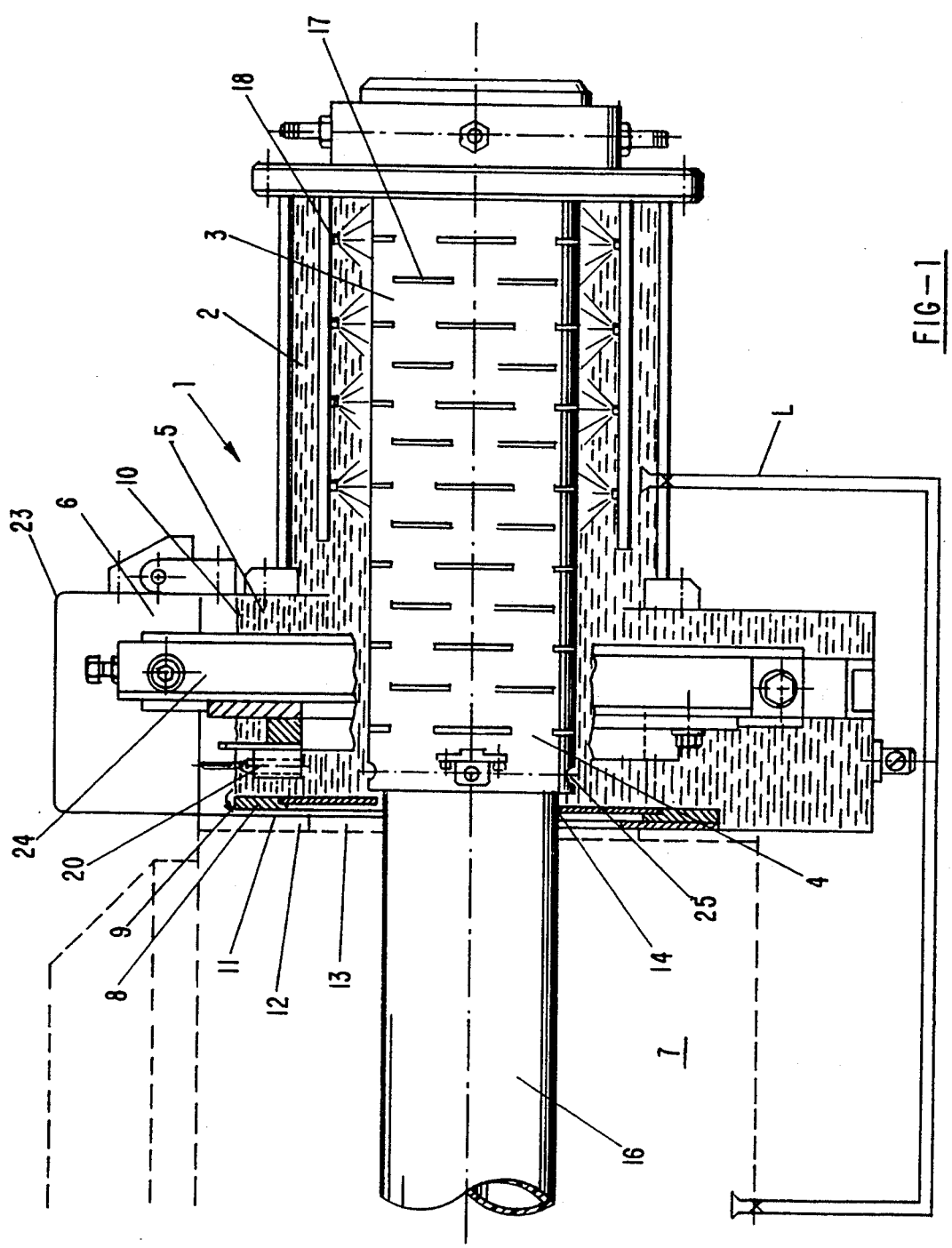
FIG. 1 shows in a schematic representation the extruding device of the present invention having a chamber which encloses the calibrating sleeve and the measuring device and which has a downstream vacuum tank.

The extruding device for extruding plastic tubing according to the present invention is primarily characterized by:

An extruder with an outlet;

A cooling device connected to the outlet of the extruder, the cooling device comprising a water-filled chamber and a circulating cooling element in the form of a vacuum tank directly connected downstream to the water-filled chamber such that a sealed passage for the plastic tubing between the water-filled chamber and the vacuum tank is provided;

The water-filled chamber having a water-filled cooling part and a water-filled measuring part;

A water- and vacuum-conveying connection between the measuring part and the vacuum tank;

A water-cooled calibrating sleeve with an inner wall surface connected within the cooling part and completely immersed in water, the calibrating sleeve pulling the extruded plastic tubing against the inner wall surface; and A measuring device for measuring the wall thickness of the plastic tubing, connected within the measuring part, the measuring device comprising at least one ultrasonic measuring head radially positioned relative to the plastic tubing, the measuring head measuring the plastic tubing through the water within the measuring part.

Preferably, the connection comprises a sliding seal for adjusting the water level within the measuring part. The measuring part preferably has a vacuum-tight cover that is openable for providing access to the measuring device.

The device further comprises a line connected between the vacuum tank and the cooling part for refilling the water level within the cooling part with water flowing from the vacuum tank.

Expediently, the measuring device measures the wall thickness of the plastic tubing directly adjacent to a free end of the calibrating sleeve. Alternatively, the measuring device measures the wall thickness of the plastic tubing at a section of the plastic tubing that is supported by the calibrating sleeve.

Preferably, the calibrating sleeve has an end section coordinated with the measuring device, the end section having at least one passageway for ultrasonic waves of the measuring head. The end section preferably has a plurality of passageways arranged over the circumference of the end section and a plurality of measuring heads is stationarily coordinated with those passageways.

The end section may also be separated from the calibrating sleeve by an intermediate space. Preferably, the measuring head is rotatable and/or reversible about the plastic tubing within the intermediate space. In the alternative, the measuring head may be rotatable and/or reversible about the plastic tubing above the intermediate space. Preferably, the intermediate space has a width that is slightly greater than the width of the measuring head.

In a further embodiment of the present invention, the device further comprises an axial guide for guiding the measuring head when axially advanced in a rotating and/or reversible fashion about the plastic tubing over a given angular range and wherein the passageway extends spirally over the angular range. In a further embodiment of the present invention the extruding device comprises two measuring heads that are axially advanced in a rotating and/or reversible fashion about the plastic tubing 16 over a given angular range and are staggered relative to one another axially and over the angular range, and wherein each measuring head has coordinated therewith one said passage way in the form of a groove extending over a portion of the angular range to be covered by the measuring head, and with the grooves axially staggered relative to one another.

The device may further comprise a frame for supporting the measuring device, the frame being radially movably connected to the measuring part.

Preferably the measuring device is slidable in the axial direction of the calibrating sleeve past an end section thereof.

In a further embodiment of the present invention, the cooling part further comprises nozzles for agitating the water within the cooling part.

The gist of the invention lies in the feature that the calibrating sleeve and the measuring device are arranged in a common water-filled chamber comprising a cooling part and a measuring part whereby the calibrating sleeve is positioned in the cooling part of the chamber which is completely filled with water and the measuring device is arranged within the water filled measuring part so that an ultrasonic coupling of the at least one measuring head to the extruded plastic tubing is achieved through the water-filled space. The chamber is connected to the vacuum tank with a sealed passage for the extruded plastic tubing. The device further has a water-and vacuum-conveying connection between the measuring part and the vacuum tank.

The advantage of the present invention lies in the fact that the cooling of the calibrating sleeve is much more effective because the sleeve is completely immersed in water whereby due to the complete wetting of the outer surface the gliding properties of the extruded plastic tubing within the calibrating sleeve are improved for feeding the tubing. The coupling of the measuring heads to the plastic tubing to be measured is also improved due to the complete immersion in water so that more reliable measurements may be taken without running the risk of misreadings due to fluctuations within the coupling medium (water). Furthermore, the measurement of the wall thickness of different plastic tubing does not any longer present a problem because an adaptation of the water column is no longer necessary. Furthermore, a complicated apparatus for supplying the calibrating sleeve and the measuring device with water is obsolete. Due to the water- and vacuum-conveying connection between the chamber and the vacuum tank the vacuum already present within the vacuum tank as well as the cooling water present therein are now also accessible for the cooling part and the measuring part of the chamber.

According to a special embodiment of the invention the connection between the vacuum tank and the measuring part of the chamber comprises an easily exchangeable sliding seal for adjusting the water level within the measuring part of the chamber. The sliding seal may be of a greater diameter than the outer plastic tubing diameter because the amount of cooling water is so great that despite a minimal water passage within the area of the sliding seal water will build up in the chamber and will primarily flow through the sliding seal. Accordingly the sealing effect is achieved by a thin water film which does not interfere with the desired sealing because on either side of the sliding seal water is present in the chamber.

Advantageously, the chamber in its measuring part is provided with a vacuum-type cover which is openable and therefore provides access to the measuring device so that an adjustment and mounting of the measuring device is facilitated when an exchange of the calibrating sleeve is necessary.

According to a further embodiment of the invention, between the vacuum tank and the cooling part of the chamber a line for recycling water from the vacuum tank into the cooling part and maintaining the water level in the chamber is provided so that a supply of water and vacuum to the chamber is possible without problems.

According to another embodiment of the present invention, the measurement of the wall thickness of the extruded plastic tubing is performed directly adjacent to the free end of the calibrating sleeve.

In another advantageous embodiment of the invention the measurement of the wall thickness of the extruded plastic tubing is carried out at a section of the plastic tubing which is supported by the calibrating sleeve. This is advantageous because due to the early measurement of the wall thickness of the extruded plastic tubing within the area of the calibrating sleeve it is possible to detect deviations of the desired wall thickness at an early stage of the manufacturing process so that a correction or adjustment of the extruder is possible with only a short downtime. Accordingly, the discard rate of the extruding device can be reduced and due to the thus possible fine adjustment extra weight and thus material may be saved.

Another advantage lies in the fact that the measurement within the calibrating sleeve and thus the support and guidance provided by the calibrating sleeve is present during the measuring step so that the plastic tubing is guided without oscillations within the calibrating sleeve and the measuring inaccuracy further is reduced. Furthermore, after exactly aligning the measuring head, it is ensured that the ultrasonic waves emitted by the measuring head exactly and reproducibly impact at an angle of 90° the surface of the plastic tubing because the tubing does not change its defined positioned within the calibrating sleeve during the measuring step.

Due to the measurements being performed at the end section of the calibrating sleeve it is furthermore insured that the extruded plastic tubing has a homogenous temperature which is also an important requirement for accurately measuring the wall thickness by ultrasonic waves. It is furthermore possible, due to the fixation of the diameter of the plastic tubing within the calibrating sleeve and due to the exact termination of the median wall thickness, to exactly calculate the medium weight of the extruded plastic tubing based on the ultrasonic measurements.

Due to the coordination of the measuring device with the end section of the calibrating sleeve it is inventively possible to perform a contact-free wall thickness measurement of the extruded plastic tubing so that deformations, especially of thin walled extruded plastic tubing, do not occur.

According to a further embodiment of the invention it is suggested that at least one ultrasonic measuring head is arranged radially relative to the surface of the calibrating sleeve. In this embodiment the measurement of the wall thickness is carried out through the material of the calibrating sleeve so that when evaluating the ultrasonic measurement values they must be corrected by the known dimensions of the calibrating sleeve. Since these dimensions for the calibrating sleeve are known and will not change during the extrusion process of the plastic tubing, the respective required correction is without influence on the determination of the wall thickness of the extruded plastic tubing.

In a preferred embodiment of the invention a calibrating sleeve that at its end section is designated for measuring the wall thickness of the plastic tubing is provided with passageways for at least one ultrasonic measuring head so that a direct measurement of the wall thickness without any corrections is possible. In a first embodiment of the present invention with stationarily arranged measuring heads it is provided that the calibrating sleeve has a plurality of passageways which are distributed over the circumference of the calibrating sleeve. Above these passageways one or more measuring heads are arranged so that a measurement can take place through the passage ways without any interference. It is possible to provide a plurality of measuring heads over the circumference of the plastic tubing within the end section of the calibrating sleeve.

In a further embodiment of the present invention one individual measuring head is arranged rotatably and/or reversibly movable over an angular range of the plastic tubing and the passageway for the measuring head is spirally arranged over the angular range of the measuring head whereby a device for guiding the measuring head during its axial advancement is provided. Such an embodiment is especially suitable when only one measuring head is used for covering an angular range of 360°.

According to another embodiment of the present invention a plurality of rotatably and/or reversibly movable measuring heads is provided, whereby each measuring head covers a portion of the angular range. In this embodiment a plurality of groove-shaped passageways is provided which has a length corresponding to the angular range to be covered by the coordinated measuring head and which are staggered in the longitudinal, respectively, axial direction of the calibrating sleeve. A spiral embodiment of the grooves is no longer necessary, because it is possible to arrange the Grooves and the movement path of the measuring head in one radial plane of the longitudinal axis of the calibrating sleeve.

By providing a cover for the chamber it is ensured that the measuring device is easily accessible upon removal or opening of the cover for maintenance and service work, respectively, adjusting operations. In this context, it is especially expedient to support the measuring device on a frame which is radially movable within the measuring part of the chamber so that the measuring device may be lifted from the chamber. The measuring device is comprised of a plate which is lowerable to the end section of the calibrating sleeve, the plate having connected thereto the measuring heads staggered relative to one another in the longitudinal direction of the calibrating sleeve so that measuring heads are positioned over the end section of the calibrating sleeve.

Expediently, the measuring device may be arranged axially slidable over the end section of the calibrating sleeve so that the measuring heads may also be adjustable in the longitudinal direction of the calibrating sleeve, respectively, its end section.

DESCRIPTION OF THE PREFERRED EMBODIMENTS

The present invention will now be described in detail with the aid of several specific embodiments utilizing FIGS. 1 through 7.

The extruding device represented in FIG. 1 comprises a chamber 1 which is connected to an extrusion head of an extruder not represented in the drawing. The forward cooling part 2 contains a calibrating sleeve 3 having an end section 4 extending into the measuring part 5 of the chamber 1. A measuring device 6 for measuring the wall thickness of the extruded plastic tubing is coordinated with the end section 4 of the calibrating sleeve 3. Downstream of the chamber 1 a circulating cooling element in the form of a vacuum tank 7 is provided which is connected via line L in a water- and vacuum-conveying manner to the chamber 1. The plastic tubing 16 is further cooled in a manner known per se within the vacuum tank 7.

In a manner known per se the calibrating sleeve 3 is provided with slots 17 over its circumference in its longitudinal direction. The cooling part 2 of the chamber 1 is provided with nozzles 18 arranged over the length of the calibrating sleeve and over its circumference. The nozzles 18 serve to agitate the water which surrounds the calibrating sleeve 3 so that the cooling effect on the calibrating sleeve is further improved due to the total immersion ("full bath"). The execution of the calibrating process itself, i.e., with an applied vacuum as described in the aforementioned German Offenlegungsschrift 39 36 496 or, alternatively, in a manner known per se under the influence of supporting air, depends on the embodiment of the respective extrusion device.

Between the vacuum tank 7 and the chamber 1, respectively, its measuring part 5, a sliding seal 8 is provided which encloses the extruded plastic tubing 16 in a sealing manner and is provided at its upper portion with an overflow 9 the position of which determines the water level 10 within the chamber 1, respectively, its measuring part 5. The exchange of the sliding seal 8 allows the adjustment of the overflow 9 and accordingly of the water level 10 within the chamber 1. The sliding seal 8 surrounds the extruded plastic tubing 16 at a minimal distance so that a gap 14 is present between the sliding seal 8 and the plastic tubing 16. This gap 14 is filled by a water film which is present at the outer mantle surface of the plastic tubing 16 whereby this minimal water passage is of no effect since on either side of the sliding seal 8 the chamber is filled with water. Due to the large amount of cooling water within the chamber 1 the water adjusts or levels at the indicated water level 10. The sliding seal 8 is arranged at a distance 11 from the separating wall 12 located between the vacuum tank 7 and the chamber 1, whereby the separating wall 12 is provided with an opening 13 to the vacuum tank 7 so that via the path formed by the opening 13, the space 11, and the overflow 9 water may flow from the chamber 1 into the vacuum tank 7 and at the same time the vacuum present within the vacuum tank 7 may act on the chamber 1 with its measuring part 5 and cooling part 2. Not further represented, between the vacuum tank 7 and the cooling part 2 of the chamber 1 a line is arranged via which a flow of water from the vacuum tank 7 into the chamber 1 is possible so that in this manner an exchange of cooling water in the chamber 1 takes place.

The measuring device 6 for measuring the wall thickness of the plastic tubing 16 is arranged in the measuring part 5 of the chamber 1 and in the representation shown has two ultrasonic measuring heads 20 which are staggered by an angle of 90° over the circumference of the calibrating sleeve 3. Since the chamber 1 is filled with water a contact-free measurement via ultrasonic waves in the water-filled space can be most effectively performed. Simultaneously, the chamber 1 is under vacuum in order to prevent any negative influence of air bubbles on the measurements.

The measuring part 5 of the chamber 1 is provided with an openable cover 23 via which an unhindered access to the measuring device 6 for its adjustment and service is possible. For this purpose, one or more measuring heads 20 are supported at a frame 24 within the chamber 1 whereby this frame 24 is liftable (removable) from the chamber 1 in an upward direction when the cover 23 is in its open position and the calibrating sleeve 3 has been removed.

Figure 2:
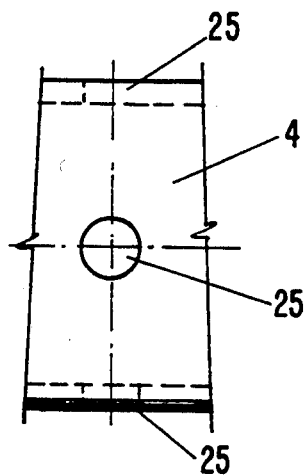
FIG. 2 shows in detail the end section of the calibrating sleeve according to FIG. 1 with passages for the measuring head.

In the embodiment represented in FIG. 1 and 2 the measuring device 6 is comprised of two stationary measuring heads 20. A calibrating sleeve 3 is provided with bores 25 distributed over the circumference of the end section 4. Above the bores 25 the measuring heads 20 are arranged for measuring the wall thickness of the plastic tubing 16 pulled through the calibrating sleeve 3. As can be seen in more detail in FIG. 2, a total of four bores 25 staggered at an angle of 90° relative to one another are provided with only two of the bores 25, staggered by 90° relative to one another, being provided with a measuring head 20 in order to perform measurements at planes that are positioned at a 90° angle relative to one another. The measurement is thus performed through the respective coordinated bores 25 without interference of the calibrating sleeve 3.

Figure 3:
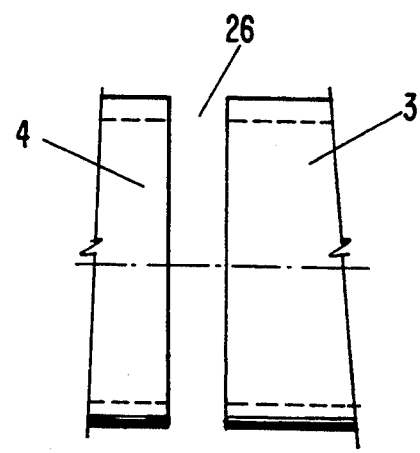
FIG. 3 shows the device according to FIG. 2 in a further embodiment.

In the embodiment represented in FIG. 3, the end section 4 is separated from the main body of the calibrating sleeve 3 by an intermediate space 26. This provides the option to have a measuring head 20 rotatably, respectively, reversibly moved about or within the intermediate space 26 in order to circle the plastic tubing 16. However, with this arrangement a straight guidance of the tubing 16 is not interrupted because the tubing 16 is guided under the same conditions within the calibrating sleeve 3 and within its end section 4, i.e., before and behind the measuring position within the intermediate space 26. The end section 4 in this embodiment is connected to the sliding seal 8.

Figure 4:
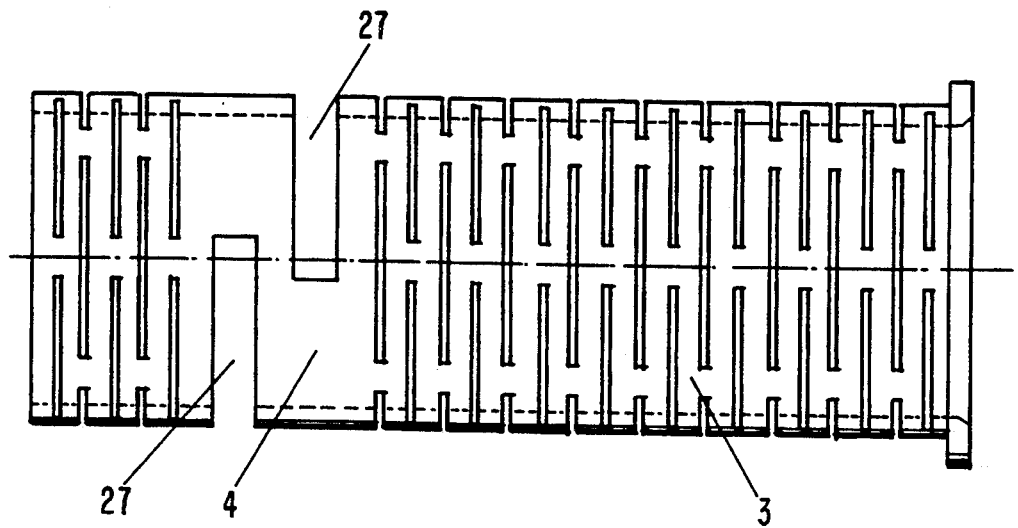
FIG. 4 shows the device of FIG. 2 in another embodiment.

FIG. 4 shows an embodiment of the end section 4 of the calibrating sleeve 3 for arranging two rotatably and/or reversibly arranged measuring heads 20 each covering an angular range of 180° of the plastic tubing 16. For this purpose, the end section 4 of the calibrating sleeve 3 is provided with two grooves 27 extending over a range of 180° which in the longitudinal direction of the end section 4 are staggered relative to one another so that the two coordinated measuring heads 20 move in a rotating and/or reversing fashion over the grooves 27.

Figure 5:
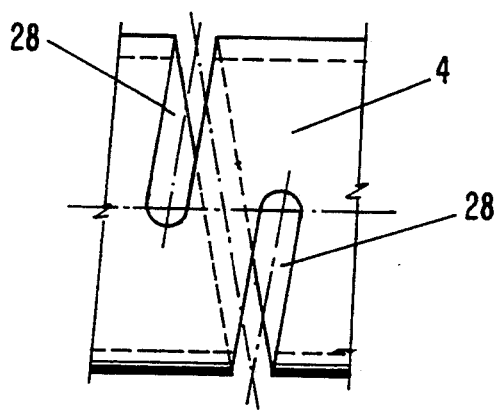
FIG. 5 shows the device of FIG. 2 in a different embodiment.

FIG. 5 shows a slight variation in which a single measuring head covers an angular range of 360°. For this purpose, the end section 4 of the calibrating sleeve 3 is provided with a spirally extending groove 28 covering a range of 360°. For this embodiment, a Guide is required for guiding the measuring head during its 360° rotation as well as during its axial displacement in the axial direction of the calibrating sleeve 3. This axial displacement corresponds to the total pitch of the spiral groove 28 in the axial direction of the calibrating sleeve 3.

The present invention also encompasses an embodiment not represented in the drawings in which the stationary or rotatingly and/or reversibly movable measuring heads are arranged such that they perform the measurement of the wall thickness through the calibrating sleeve. The thus correspondingly determined measured values must be corrected by a constant corresponding to the thickness of the calibrating sleeve.

Figure 6:
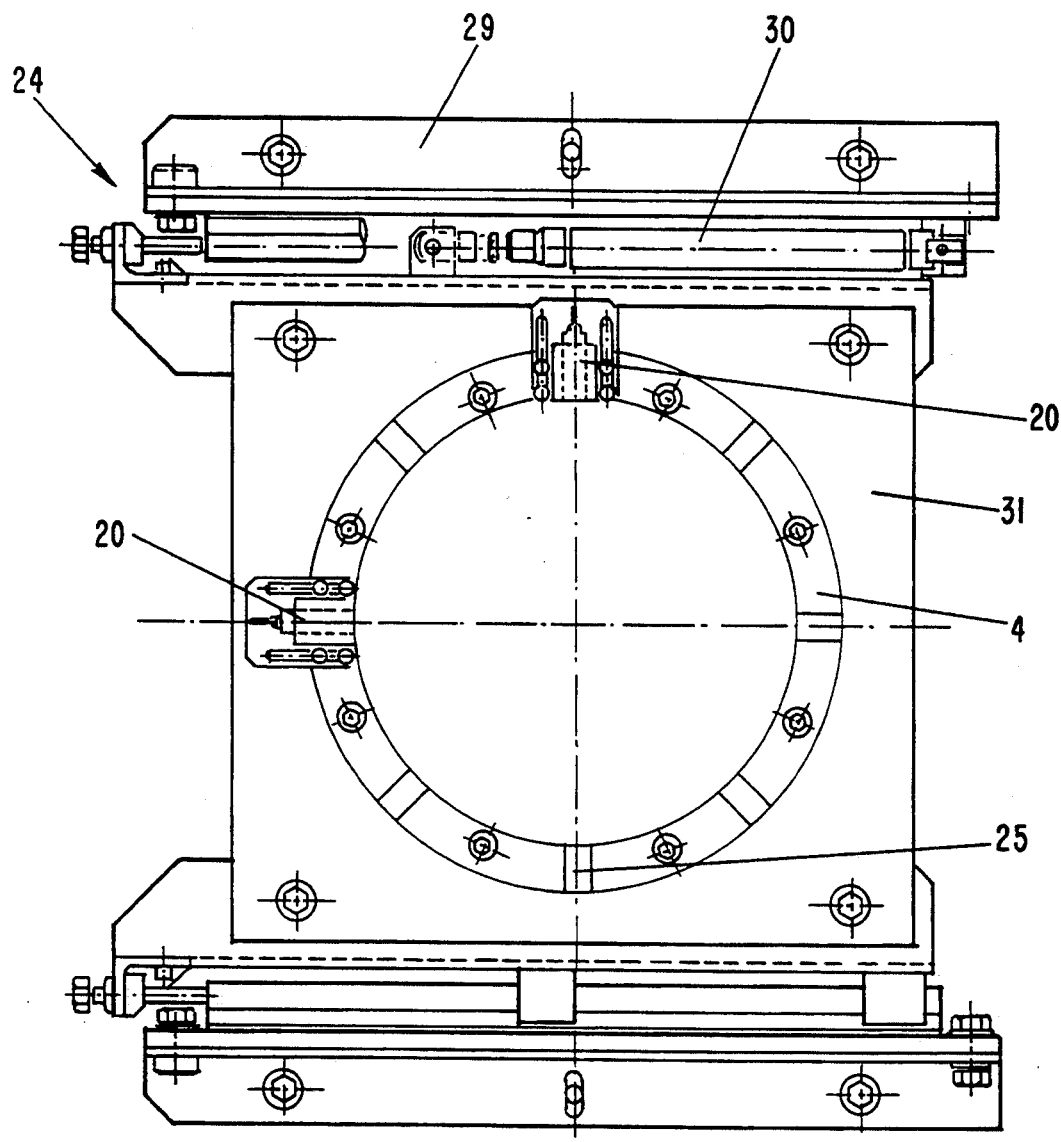
FIG. 6 is a detailed representation of an end view of the measuring device according to FIGS. 1 and 2.
Figure 7:
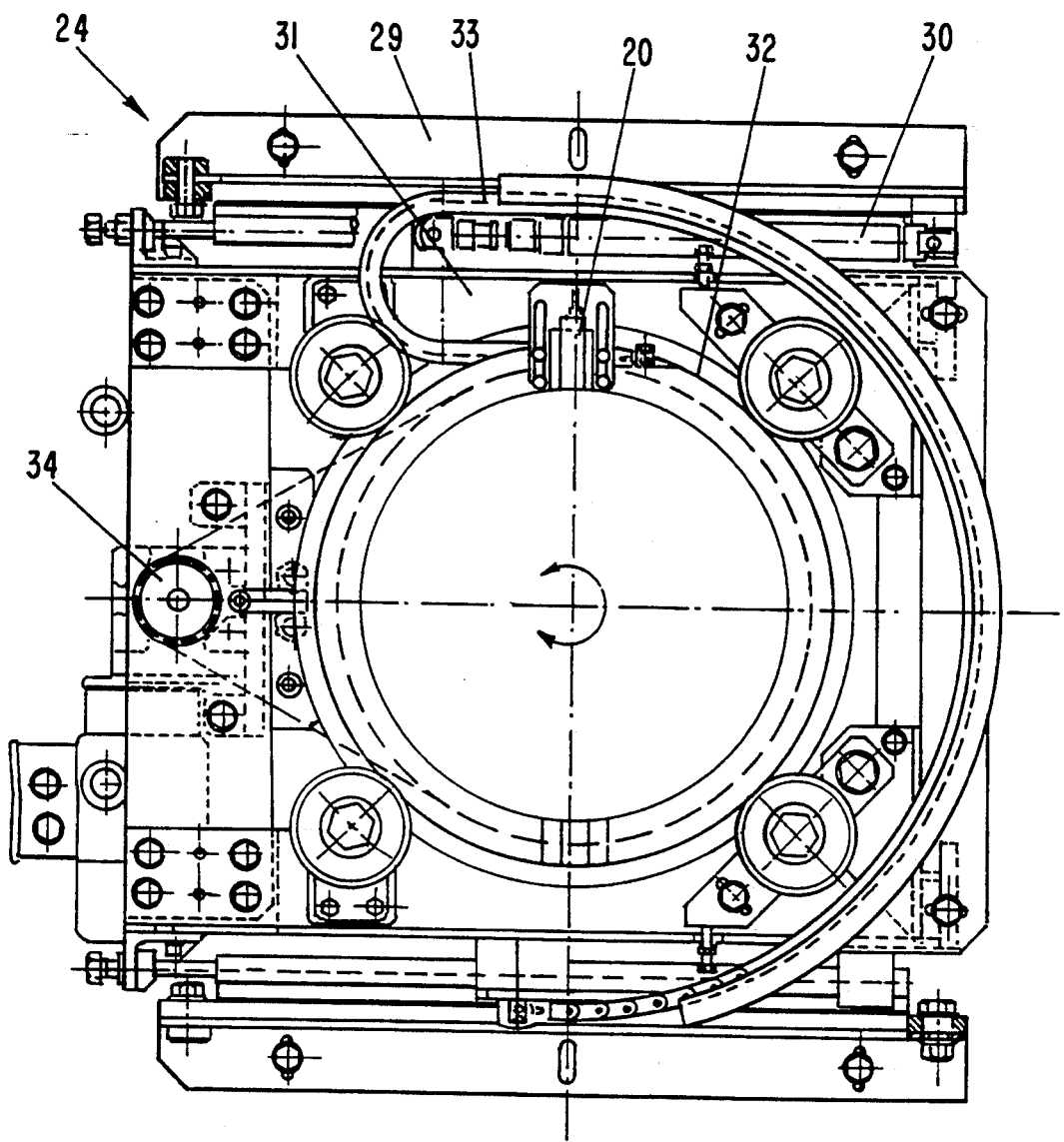
FIG. 7 shows the device of FIG. 6 in a further embodiment corresponding to FIG. 5.

FIGS. 6 and 7 show two alternative embodiments of the arrangement of the measuring heads of the measuring device.

The embodiment of FIG. 6 shows the arrangement of stationary measuring heads 20 on frames 24 arranged within the measuring part 5 of the chamber 1. The frame 24 has a guide 29 connected to the wall of the chamber 1. A plate 31 is movable within the guide 29 by cylinders 30. The plate 31 with its end face can be positioned at the free end of the end section 4 of the calibrating sleeve 3. For this reason the representation of FIG. 6 also shows the end face of the end section 4 of the calibrating sleeve 3. The plate 31 has connected thereto two measuring heads 20 which are axially displaced in the longitudinal direction of the calibrating sleeve 3 at the plate 31 so that relative to the plate 31 positioned at the end face of the end section 4 of the calibrating sleeve 3 the measuring heads 20 are located over the end section 4.

FIG. 7 shows a corresponding arrangement of a rotatively and/or reversingly arranged measuring head 20 which for this purpose is guided within an annular guide 32 over the circumference of the end section 4 of the calibrating sleeve 3 and is connected via a drag chain 33 to a power supply and transmission station for the measured value. A drive 34 moves the measuring head 20 within the annular guide 32. In this embodiment, the arrangement also encompasses a slidable plate 31 which is height-adjustable in a stationary guide 29 by cylinders 30.

The present invention is, of course, in no way restricted to the specific disclosure of the specification and drawings, but also encompasses any modifications within the scope of the appended claims.

What we claim is:

1. An extruding device for extruding plastic tubing comprising:
   an extruder with an outlet;

a cooling device connected to said outlet of said extruder, said cooling device comprising a water-filled chamber and a circulating cooling element in the form of a vacuum tank directly connected downstream to said water-filled chamber such that a sealed passage for the plastic tubing between said water-filled chamber and said vacuum tank is provided;

said water-filled chamber having a water-filled cooling part and a water-filled measuring part;

a water- and vacuum-conveying connection between said measuring part and said vacuum tank;

a water-cooled calibrating sleeve with an inner wall surface connected within said cooling part and completely immersed in water, said calibrating sleeve pulling the extruded plastic tubing against said inner wall surface; and a measuring device, for measuring the wall thickness of the plastic tubing, connected within said measuring part, said measuring device comprising at least one ultrasonic measuring head radially positioned relative to the plastic tubing, said measuring head measuring the plastic tubing through the water within said measuring part.

2. An extruding device according to claim 1, wherein said connection comprises a sliding seal for adjusting the water level within said measuring part.

3. An extruding device according to claim 1, wherein said measuring part has a vacuum-tight cover that is openable for providing access to said measuring device.

4. An extruding device according to claim 1, further comprising a line connected between said vacuum tank and said cooling part for refilling the water level within said cooling part with water flowing from said vacuum tank.

5. An extruding device according to claim 1, wherein said calibrating sleeve has an end section coordinated with said measuring device, said end section having at least one passageway for ultrasonic waves of said measuring head.

6. An extruding device according to claim 5, wherein said end section has a plurality of said passageways arranged over the circumference of said end section and wherein a plurality of said measuring heads are stationarily coordinated with said passageways.

7. An extruding device according to claim 5, wherein said end section is separated from said calibrating sleeve by an intermediate space.

8. An extruding device according to claim 7, wherein said measuring head is rotatable and reversible about the plastic tubing in said intermediate space.

9. An extruding device according to claim 7, wherein said measuring head is rotatable and reversible about the plastic tubing above said intermediate space.

10. An extruding device according to claim 7, wherein said intermediate space has a width that is slightly greater than a width of said measuring head.

11. An extruding device according to claim 5, further comprising an axial guide for guiding said measuring head when axially advanced in a rotating and reversible fashion about the plastic tubing over a given angular range and wherein said passageway extends spirally over said angular range.

12. An extruding device according to claim 5, comprising two measuring heads that are axially advanced in a rotating and reversible fashion about the plastic tubing over a given angular range and are staggered relative to one another axially and over said angular range, and wherein each said measuring head has coordinated therewith one said passageway in the form of a groove extending over a portion of said angular range to be covered by said measuring head, with said grooves axially staggered relative to one another.

13. An extruding device according to claim 1, further comprising a frame for supporting said measuring device, said frame radially movably connected to said measuring part.

14. An extruding device according to claim 1, wherein said measuring device is slidable in the axial direction of said calibrating sleeve past an end section thereof.

15. An extruding device according to claim 1, wherein said cooling part further comprises nozzles for agitating the water in said cooling part.

16. An extruding device according to claim 7, wherein said measuring head is rotatable about the plastic tubing in said intermediate space.

17. An extruding device according to claim 7, wherein said measuring head is reversible about the plastic tubing in said intermediate space.

18. An extruding device according to claim 7, wherein said measuring head is rotatable about the plastic tubing above said intermediate space.

19. An extruding device according to claim 7, wherein said measuring head is reversible about the plastic tubing above said intermediate space.

20. An extruding device according to claim 5, further comprising an axial guide for guiding said measuring head when axially advanced in a rotating fashion about the plastic tubing over a given angular range and wherein said passageway extends spirally over said angular range.

21. An extruding device according to claim 5, further comprising an axial guide for guiding said measuring head when axially advanced in a reversible fashion about the plastic tubing over a given angular range and wherein said passageway extends spirally over said angular range.

22. An extruding device according to claim 5, comprising two measuring heads that are axially advanced in a reversible fashion about the plastic tubing over a given angular range and are staggered relative to one another axially and over said angular range, and wherein each said measuring head has coordinated therewith one said passageway in the form of a groove extending over a portion of said angular range to be covered by said measuring head, with said grooves axially staggered relative to one another.

23. An extruding device according to claim 5, comprising two measuring heads that are axially advanced in a rotating fashion about the plastic tubing over a given angular range and are staggered relative to one another axially and over said angular range, and wherein each said measuring head has coordinated therewith one said passageway in the form of a groove extending over a portion of said angular range to be covered by said measuring head, with said grooves axially staggered relative to one another.

* * * * *